United States Patent [19]

Scardovi

[11] Patent Number: 4,695,852

[45] Date of Patent: Sep. 22, 1987

[54] INK JET PRINT HEAD

[75] Inventor: Alessandro Scardovi, Ivrea, Italy

[73] Assignee: Ing. C. Olivetti & C., S.p.A., Ivrea, Italy

[21] Appl. No.: 922,451

[22] Filed: Oct. 23, 1986

[30] Foreign Application Priority Data

Oct. 31, 1985 [IT] Italy .............................. 67918 A/85

[51] Int. Cl.[4] .............................................. G01D 15/18

[52] U.S. Cl. .................................................. 346/140 R

[58] Field of Search .......................................... 346/140

[56] References Cited

U.S. PATENT DOCUMENTS 4,323,908 4/1982 Lee ........................................ 346/140

4,466,005 8/1984 Yoshimura ........................... 346/140

4,518,974 5/1985 Isayama ............................... 346/140

*Primary Examiner*—Joseph W. Hartary

*Attorney, Agent, or Firm*—Banner, Birch, McKie & Beckett

[57] ABSTRACT

A print element is actuated by a piezoelectric transducer controlled by a circuit which is capable of emitting a pulse in such a way that the reflection waves arising from expulsion pressure in the conduit for the ink are cancelled. The transducer is also connected to a circuit for detecting the pressure of the ink during the printing operation. A circuit for detecting the malfunctioning is capable of storing and signalling both the presence of bubbles in the conduit and the conduit empty condition. For bubbles, a flip-flop in the malfunction detecting circuit stores a signal indicating the presence of reflection phenomena when control circuit is operated for cancellation of the reflection waves. For the conduit empty condition it stores a signal indicative of the absence of reflection phenomena when the control circuit is operated in such a way that cancellation of the reflection waves does not occur.

8 Claims, 2 Drawing Figures

INK JET PRINT HEAD

BACKGROUND OF THE INVENTION

The present invention relates to an ink jet print head comprising an ink reservoir connected to at least one print element having an ink outlet, a piezoelectric transducer which is actuable by a pulse generated selectively by a control circuit for causing the emission of a drop of ink through the outlet, and a circuit for detecting the pressure of the ink in the element during the printing operation.

For an ink jet printer to operate correctly, especially one in which emission is controlled by a pressure pulse generated for example by a piezoelectric transducer, the print element must be completely full of ink. Arrangements are known which can be actuated to purge the print elements in a purge station at the beginning of the print operation. Those arrangements are actuated as a precaution independently of the operation of filling the print element, with the result that they often cause an accumulation of ink which has been purged in the purge station.

Devices are also known which can be actuated to remove any bubbles of air from the print element. In U.S. Pat. No. 4,466,005, there is described an arrangement for removing bubbles of air from a print element, which is controlled automatically by an electrical signal generated by a bubble detection circuit. The arrangement comprises a circuit which is operable to generate trains of pulses at various frequencies and voltages, in such a way as to eliminate various types of bubbles. That arrangement is complicated but is not capable of purging the print element when the element is completely empty.

SUMMARY OF THE INVENTION

The technical problem of the present invention is that of detecting and signalling in a simple and economical manner the state of filling with ink of the print element.

According to the present invention the technical problem is solved in that the said control circuit can be regulated in such a way as to vary the and duration of the said pulse in such a way that acoustic reflection waves arising from the pressure wave generated by expulsion of the ink drop are cancelled, and memory means controlled by the said control circuit are provided to store data corresponding to the pressure detected after emission of the ink drop.

BRIEF DESCRIPTION OF THE DRAWINGS

A preferred embodiment of the present invention will now be described as a non-limiting example with reference to the accompanying drawings in which:-

DESCRIPTION OF THE PREFERRED EMBODIMENTS

Figure 1:
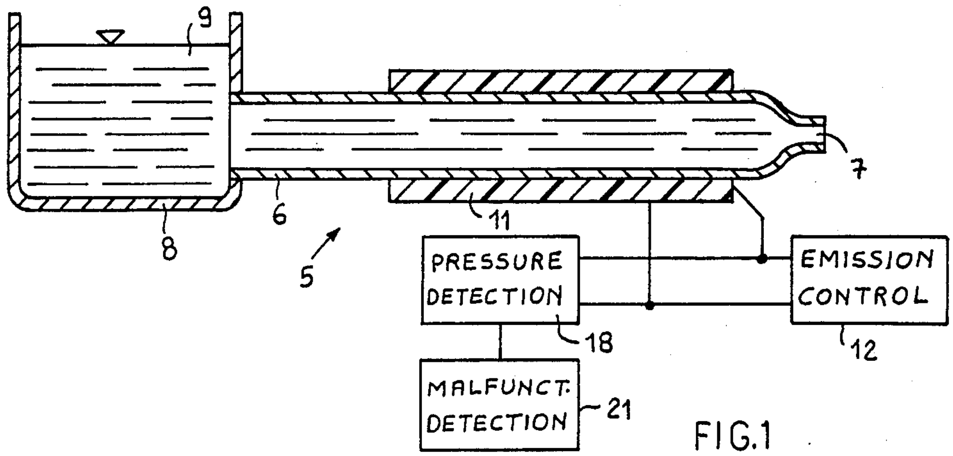
FIG. 1 is a diagrammatic view in section of a print element incorporating a device for detecting filling with ink, in accordance with the invention.
Figure 2:
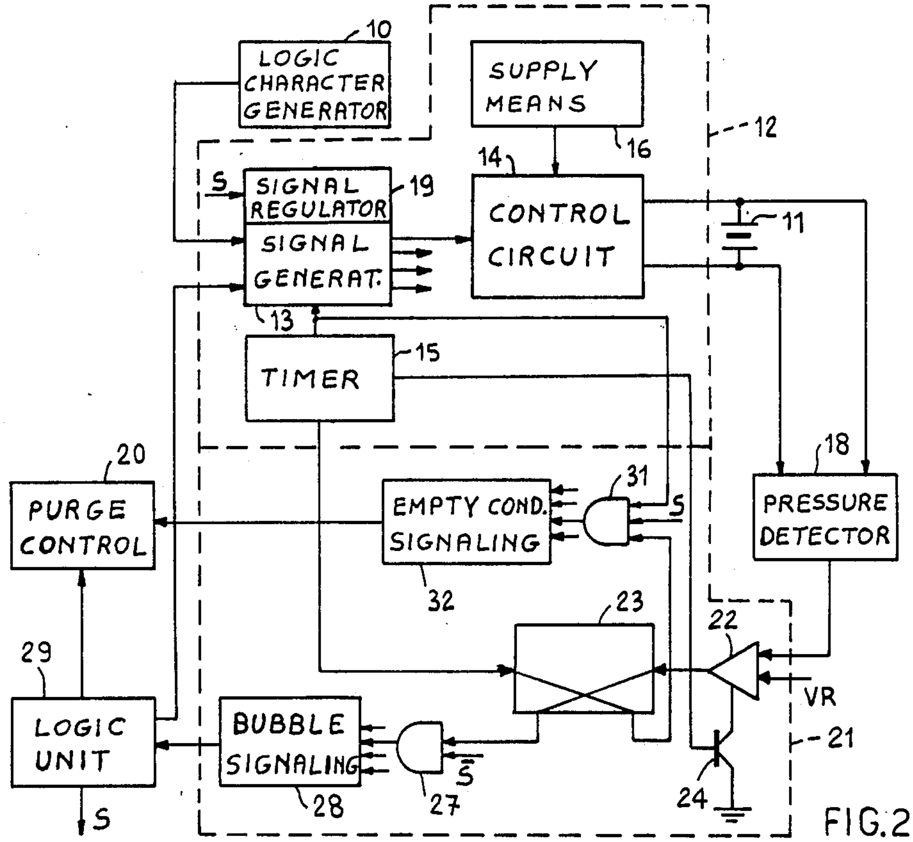
FIG. 2 shows a block circuit diagram of the detection and control device for purging of the print element.

In FIG. 1 a selective or on-demand ink jet print element 5 is shown comprising a cylindrical conduit 6 which is terminated at its form end with a nozzle 7 and which is connected at its rear end to a reservoir 8 for ink 9. Fitted on the conduit 6 is a piezoelectric transducer 11 which is in the form of a sleeve and which is excited by way of a circuit 12 for controlling the emission of the drop of ink. The circuit 12 comprises a logic signal generator 13 (see FIG. 2) which, under the control of a character generator 10 and a timer 15, controls the control circuit 14 connected to a voltage supply means 16. The circuit 14 then emits a voltage pulse which excites the transducer 11 to generate a pressure wave in the ink 9 in the conduit 6, whereby a drop of ink is caused to issue from the nozzle 7.

The control circuit 12 is connected to a circuit 18 which is capable of detecting the pressure of the ink 9 in the conduit 6. In particular the circuit 18 may be of the type described in our Italian patent application no. 67276-A/85 filed on Mar. 22, 1985, in which the same piezoelectric transducer 11 is used as the pressure sensor.

As is known, the pressure waves due to the acoustic reflection depend on the form and duration of the excitation pulse, the form, length and material of the hydraulic circuit for the ink, and the medium in which the waves are propagated, that is to say ink when the conduit is full. It will be clear therefore that such reflection is greatly altered by the presence of bubbles in the conduit 6, while whenever the latter is completely empty the variation in pressure which is found in air is negligible with respect to that in the ink and is practically undetected by the circuit 18.

The circuit 14 is of the type described in our European patent application no. 86 303 009.4, in which the form and the duration of the pulse which excites the transducer 11 is such as almost totally to cancel the pressure waves due to acoustic reflection in the ink 9. That pilot control circuit may be calibrated or tuned and regulated in one or more of the components thereof in such a way as to achieve cancellation of the reflected waves, in the specific hydraulic circuit of the conduit 6. The regulating effect may be produced for example by means of a circuit 19 which is capable of varying the duration of the signal generated by the generator 13 in such a way that that variation causes a variation in the duration of the excitation pulse emitted by the circuit 14.

The printer may comprise a print head provided with a plurality of print elements 5, with the associated circuits 14 and 18. It further comprises a purge station, generally formed by a cap for covering each nozzle 7 when the head remains inactive for a certain period of time, for the purposes of reducing evaporation of the ink 9 and associated incrustation in the nozzle or nozzles 7. The purge station may comprise a suction pump which is operable to suck the ink 9 from the reservoir 8, by way of the nozzle 7, restoring the filling of ink in the conduit 6 and expelling any bubbles present therein. The pump is operated under the control of a suitable purge control circuit 20, as will be seen in greater detail hereinafter.

In accordance with the invention, the print head 5 is now provided with a circuit 21 indicated in FIG. 1, which makes use of the possibility afforded by the pilot-control circuit 14 (see FIG. 2) for cancellation of reflection phenomena, and the circuit 18 for detecting the pressure waves due to the reflection phenomenon, in order to detect malfunctioning of the head 5 (see FIG. 1) due to the presence of air bubbles in the conduit 6 and due to complete emptying of the actual conduit 6. The circuit 21 comprises a comparator and pulse squarer circuit 22 which is operable to compare the pressure measuring signal, generated by the circuit 18, with a signal formed by a reference voltage VR which is at a very low level, that is to say close to zero volts. The output signal from the circuit 22 is square and is passed to memory means comprising a flip-flop 23 for storing the signal emitted by the circuit 22.

In order to provide a correct indication of the reflected waves, the circuit 22 is deactivated by way of a transistor 24 controlled by the timer 15. In particular the timer 15 begins its action on the transistor 24 to disable the circuit 22 synchronously with the pilot control pulse emitted by the circuit 14 and it terminates same when the pilot control pulse is terminated and if expulsion of the ink has been verified. From that time the circuit 22 is active and is capable of correctly signalling the presence of reflected waves. In the absence of reflected waves, its output remains at zero volts. If however wave reflection phenomena are found to occur in the conduit 6, the circuit 14 produces a sinusoidal signal which is detected and squared by the circuit 22 and stored by the flip-flop 23. The latter is then reset with a predetermined delay by a signal issuing from the timer 15.

The set output of the flip-flop 23 is connected by means of an AND-gate 27 to a bubble signalling circuit 28. The gate 27 is enabled during the printing operation by means of a signal $\bar{S}$. The signal S at high level is generated by a logic unit 29 when the print head is in the purge station. In addition, under the control of the circuit 28, the logic unit 29 is operable to move the print head to the purge station and to initiate a head purging cycle by controlling the circuit 20, as will be seen in greater detail hereinafter.

Since, in the event that the conduit 6 is empty, no reflected pressure waves can be produced, the set signal of the flip-flop 23 cannot be used for signalling the conduit empty condition. However the reset signal is used by suitably predisposing the control circuit 14. For that purpose, the signal S emitted by the logic unit 29 acts on the circuit 19, causing a variation in the duration of the pulse emitted by the generator 13, in such a way as to throw the circuit 14 out of regulation. That therefore varies the duration of the printing control pulse, whereby the latter no longer cancels the reflected waves. Under such conditions, the absence of reflected waves, that is to say, the absence of the set signal which is stored at the flip-flop 23, indicates the condition of the conduit 6 as being empty of ink.

The reset output of the flip-flop 23 is connected by means of another AND-gate 31 to a conduit empty signalling circuit 32. The gate 31 is enabled by the signal S and by a timing signal from the timer 15 synchronously with a printing pulse when the head is in the purge station, that is to say, on starting up the machine, and when the head is moved to that station under the control of the unit 29, following signalling of a bubble by the circuit 28.

In the case of a multi-nozzle print head, there is associated with each print element a circuit 22 and a flip-flop 23 with the two gates 27 and 31, for storing and signalling the state of malfunctioning of the associated ink conduit. The circuits 28 and 32 are therefore enabled when they receive a signal in respect of malfunctioning of any of the print elements 5.

The mode of operation of the above-described device is as follows:

In the rest condition the head is at the purge station whereby the print element or elements 5 are engaged with the purge pump. When the printer starts up, the logic unit 29 first emits the high-level signal S, throwing the circuit 14 out of regulation. The unit 29 then operates the transducer 11 by way of the generator 13 and the circuit 14 for a predetermined number of drop emission operations.

If in that condition the circuit 22 does not signal any reflection wave at its output, the condition 6 is certainly empty. The reset signal of the flip-flop 23 is then passed by way of the gate 31 to the circuit 32 for signalling the conduit empty condition. That circuit then operates the circuit 20 to cause operation of the pump, whereafter generation of the signal S is repeated until the reset signal of the flip-flop 23 remains low, signalling that the conduit 6 is full.

Subsequently, with the conduit 6 full, the pilot control pulse from the circuit 14 certainly causes reflection waves since the circuit 14 is still in a deregulated state. The circuit 22 now outputs a signal which sets the flip-flop 23 whereby the circuit 32 is no longer affected. The set signal of the flip-flop 23 however does not influence the circuit 28 since the signal S is at the high level.

The logic unit 29 now sets the signal S at the low level, closing the gate 31 and enabling the gate 27. The circuit 19 is also restored wherby the duration of the signal emitted by the generator 13 returns to the value required by the circuit 14 for emitting voltage pulses which are self-cancelling for the reflection waves in respect of the pressure after emission of the drop.

The unit 29 now causes a second series of drop emission operations, from the print element 5, in order to effect the operations for detecting the presence of bubbles. In the event of no reflection waves occurring, the flip-flop 23 is not set whereby the circuit 28 is not affected. After the predetermined number of drop emission operations, the unit 29 enables the head to begin the actual printing process.

If however, following a pilot control pulse, the circuit 22 detects reflection waves in the conduit 6, bubbles are present in the conduit 6. A bubble of air in the conduit 6 substantially alters the characteristic in respect of propagation of sound within the conduit, whereby the pilot control pulse is no longer capable of providing for cancellation of the reflected waves.

The output signal from the circuit 22 now sets the flip-flop 23 which, by means of the gate 27, signals the presence of the bubble to the circuit 28. The circuit 28 in turn operates the logic circuit 29 to carry out further purge cycles until the bubbles are removed.

During the printing operation, the unit 29 always holds the signal S at a low level, whereby the bubble signalling circuit 28 remains active. Therefore, if at any time, the circuit 22 issues a set signal to the flip-flop 23, the circuit 28 signals the presence of bubbles. The logic unit 29 then stops the printing operation and causes the head to move to the purge station, setting the signal S at a high level. The same operations for checking the state of the conduit 6 and any ink purge operations that may be required are then carried out as when starting up the printer.

It will be appreciated that various modifications and improvements may be made in the ink jet print head and in the associated device for detecting malfunctioning of a print element, without departing from the scope of the invention. For example, the conduit 6 and the tubular transducer 11 may be replaced by a compression chamber of different form, and a flat transducer. In addition, the signalling circuits 28 and 32 may visually signal the state of the conduits 6, leaving the operator to decide whether to carry out the operation to remove the malfunction.

We claim:

1. An ink jet print head comprising an ink reservoir connected to at least one print element having an ink outlet, a piezoelectric transducer which is actuable by a pulse generated selectively by a control circuit for causing the emission of a drop of ink through the outlet, and a circuit for detecting the pressure of the ink in the element during the printing operation, characterised in that said control circuit can be regulated in such a way as to vary the form and the duration of the pulse in such a way that acoustic reflection waves arising from the pressure wave generated by expulsion of the ink drop are cancelled, and memory means controlled by said control circuit are provided to store data corresponding to the pressure detected after emission of the ink drop.

2. A head according to claim 1 characterised in that said memory means are connected to means for comparing the signal emitted by the detector circuit with a reference signal, and store a signal indicative of the presence of bubbles in the element when said control circuit is regulated as aforesaid.

3. A head according to claim 2 characterised in that said comparison means comprise a circuit for comparing the two signals and squaring the resulting signal, said memory means comprising a circuit for holding said resulting signal.

4. A head according to claim 3 characterised by a timer for timing said control circuit to enable said comparator and squarer circuit with a predetermined delay with respect to the timing of the control circuit in such a way as to detect the said pressure after emission of the drop.

5. A head according to claim 3 for a printer having a purge station in which a purge device can be coupled to said print element characterised in that the print element is moved to the purge station and said purge device is actuated to purge the print element in response to the signal stored by said holding circuit.

6. A head according to claim 5 for a printer comprising a plurality of print elements, each associated with a corresponding control circuit and a corresponding detection circuit, characterised in that said print elements are moved to said purge station and said purge device is actuated to carry out purging of said print elements in response to a signal stored in the holding circuit associated with at least one of said print elements.

7. A head according to claim 5 characterised by means which are actuable for temporarily varying the duration of said control pulse in such a way as to exclude suppression of reflected waves, said memory means being controlled by said detector circuit in response to the actuation of said varying means, for the purpose of storing a signal which indicates that the print element is empty of ink when the detector circuit does not detect any pressure after emission of a drop.

8. A head according to claim 5 and claim 7 characterised by logic means which act when the print element is connected to the purge station for controlling actuation of said varying means, said holding circuit, when it stores the signal indicative of the element being empty, being capable of controlling said purge operation.

* * * * *